(12) United States Patent
Prakash et al.

(10) Patent No.: US 7,593,600 B2
(45) Date of Patent: Sep. 22, 2009

(54) BLACK WHITE IMAGE SCALING FOR OPTICAL CHARACTER RECOGNITION

(75) Inventors: Ravinder Prakash, Concord, NC (US); Gerhard Robert Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 10/793,452

(22) Filed: Mar. 4, 2004

(65) Prior Publication Data
US 2005/0196071 A1 Sep. 8, 2005

(51) Int. Cl.
G06K 9/32 (2006.01)
(52) U.S. Cl. ................................ 382/298; 382/299
(58) Field of Classification Search .............. 382/301, 382/298
See application file for complete search history.

(56) References Cited

U.S. PATENT DOCUMENTS

| | | | | |
|---|---|---|---|---|
| 5,113,455 | A | * | 5/1992 | Scott .......................... 382/298 |
| 5,293,432 | A | * | 3/1994 | Gonser et al. ............... 382/299 |
| 5,566,252 | A | | 10/1996 | Miyaza |
| 5,630,073 | A | * | 5/1997 | Nolan .......................... 705/45 |
| 5,631,984 | A | * | 5/1997 | Graf et al. ................... 382/317 |
| 5,717,838 | A | * | 2/1998 | LeClair ...................... 358/1.9 |
| 5,825,942 | A | | 10/1998 | Miyaza |
| 6,091,859 | A | | 7/2000 | Sonobe et al. |
| 6,400,852 | B1 | * | 6/2002 | Miller et al. ................. 382/298 |
| 6,430,321 | B1 | | 8/2002 | Choo |
| 6,600,840 | B1 | | 7/2003 | McCrossin et al. |
| 6,636,216 | B1 | * | 10/2003 | Silverbrook et al. ......... 345/427 |
| 6,726,104 | B2 | * | 4/2004 | Schuessler et al. ..... 235/462.09 |
| 6,915,026 | B2 | * | 7/2005 | Sasai ........................... 382/300 |
| 7,064,862 | B2 | * | 6/2006 | Takashimizu ................ 358/1.9 |
| 2002/0051007 | A1 | | 5/2002 | Kitagawa et al. |

OTHER PUBLICATIONS

NewSoft Presto! Bizcard, User's Guide, 2001, NewSoft Technology Corporation.*

* cited by examiner

*Primary Examiner*—Samir A. Ahmed
*Assistant Examiner*—Edward Park
(74) *Attorney, Agent, or Firm*—Yee & Associates, P.C.; Jason O. Piche (57) ABSTRACT

A system and method for capturing and scaling images includes a scaling engine with the ability to employ a first scaling factor in a first direction and a second scaling factor in a second direction. In addition, the preferred scaling engine manipulates the scaling process so that the scaling calculations are performed using fixed point arithmetic. The preferred scaling engine preserves isolated features such as a single white pixel in a field of black pixels and vice versa. Improved readability is achieved in one embodiment by performing the scaling process multiple times using different degrees of "padding" where padding refers to the technique of surrounding an image with a perimeter of one or more blank (white) pixel elements.

19 Claims, 5 Drawing Sheets

BLACK WHITE IMAGE SCALING FOR OPTICAL CHARACTER RECOGNITION

BACKGROUND

1. Field of the Present Invention

The present invention is in the field of imaging systems and more particularly imaging systems that employ scaling.

2. History of Related Art

Black-white imaging scaling is widely used in the imaging and print industry. For example, scaling is required when a black-white image needs to be scaled for inclusion in a display or printable page. In optical character recognition applications, the image must be scaled to comply with the resolution of the OCR engine.

Many image scaling techniques have been used in the past. Simple methods such as skipping pixels and scan lines are popular to produce desired image size. This method, though simple, produces strange artifacts in the image and invariably loses and/or distorts information. More complex methods either lack sufficient quality or are too mathematically intensive to be of practical benefit.

It would desirable to implement an imaging system and method for scaling images. It would be further desirable if the implemented system maintained critical information in the original image, was relatively simple from a computational perspective, and was flexible in the scaling ratios it was capable of producing.

SUMMARY OF THE INVENTION

The objectives identified above are addressed by a system and method for capturing and scaling images according to the present invention. The image capture mechanism may be optical or magnetic, such as in a check processing center. The captured image is in the form of a bi-tonal (black-white) array of picture elements (also referred to herein as pixels or pels). The pixel array is scaled using a scaling engine according to the present invention. The scaling engine includes the ability to employ a first scaling factor for a first direction and a second scaling factor in a second direction. In addition, the preferred scaling engine manipulates the scaling process so that the scaling calculations are performed using fixed point arithmetic units instead of floating point arithmetic. The preferred scaling engine focuses on pixel transitions and prioritizes the preservation of isolated features such as a single white pixel in a field of black pixels and vice versa. Improved readability is achieved in one embodiment by performing the scaling process multiple times using different degrees of "padding" where padding refers to the technique of surrounding an image with a perimeter of one or more blank (white) pixel elements. By employing multiple scaling iterations using different degrees of padding, the invention improves the probability of achieving a highly readable scaled output. The flexible scaling features of the invention facilitate an application, suitable for generating bank statements and the like, in which original objects such as checks received from a variety of customers, are scaled differently to obtain a scaled image set in which all of the items are of the same size. This feature of the invention greatly improves the readability of bank statements and similar documents.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a system and method for capturing and scaling images. A scaling engine includes the ability to employ a first scaling factor in a first direction and a second scaling factor in a second direction where the first and second scaling factors are independent of one another (i.e., they may be equal or unequal). In addition, the preferred scaling engine manipulates the scaling process so that the scaling calculations are performed using fixed point arithmetic. The preferred scaling engine preserves isolated features such as a single white pixel in a field of black pixels and vice versa. Improved readability is achieved in one embodiment by performing the scaling process multiple times using different degrees of "padding" where padding refers to the technique of surrounding an image with a perimeter of one or more blank (white) pixel elements.

Figure 6:
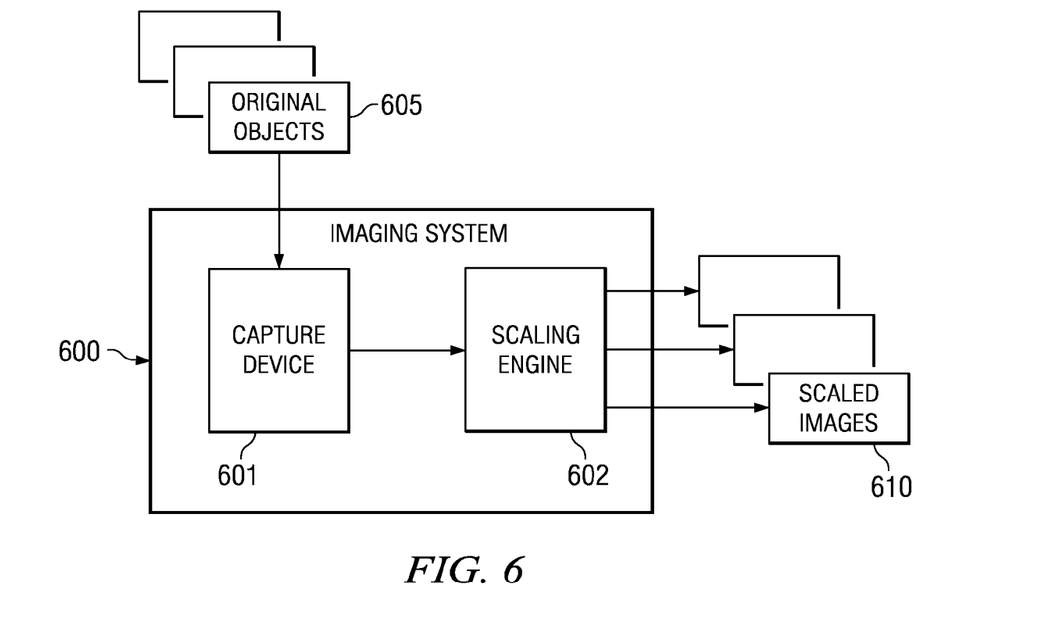
FIG. 6 illustrates selected elements of an imaging system according to one embodiment of the present invention.

Turning now to FIG. 6 of the drawings, selected elements of an imaging system 600 according to one embodiment of the invention is depicted. In its simplest embodiment, imaging system 600 includes an image capture device 601 and a scaling engine 602 according to the present invention. Image capture device 601 may include elements of conventional image capturing devices. For example, in an implementation suitable for the banking industry, image capture device 610 may comprise a portion of a high speed, high volume document processing system such as an IBM 3897 Image Capture System suitable for use in institutional banks and check processing centers. In other implementations, image capture device 601 may comprise a portion of a personal computer scanner. Image capture device 601 may employ magnetic or optical image capture techniques.

Image capture device 601 operates on original items or original documents represented in FIG. 6 by reference numeral 605. Original documents 605 may represent substantially any type of document. Of particular interest to the present invention are documents such as checks that contain alphanumeric characters. Like other documents, checks and the characters printed thereon may come in a variety of sizes. Variations in the size of text strings are undesirable for applications in which it is necessary to image large volumes of documents at high speed and with great accuracy and reliability. In fact, many application specific imaging systems assume or require a standardized format (size) for the alphanumeric string being imaged. One such standard is the Magnetic Ink Character Recognition (MICR) standard. MICR compliant character readers require input of a standardized font, commonly referred to as the E13B font. MICR readers are widely deployed in various financial applications such as check processing.

The present invention is beneficially employed to convert characters from two or more different documents, each having its own unique character format attributes, to a common character format that is suitable for receipt and processing by an application specific reader or other scanning device requiring a standardized input format. Moreover, the imaging scaling engine of the present invention is configured to produce highly readable characters using relatively simple mathematical operations and a set of guidelines designed to preserve information that is critical to recognizing the scaled image. In one embodiment, the scaling engine employs a form of redundancy to improve reliability. In this implementation, scaling engine 602 makes multiple processing scans of a particular image where the image is altered slightly for each scan such as by "padding" the image with a border of blank pixels. By scanning an image two or more times using two or more padded borders, the invention is able to obtain different "views" of the scanned image, some of which may be more suitable for recognition by an optical reader or like device.

Figures 1, 2:
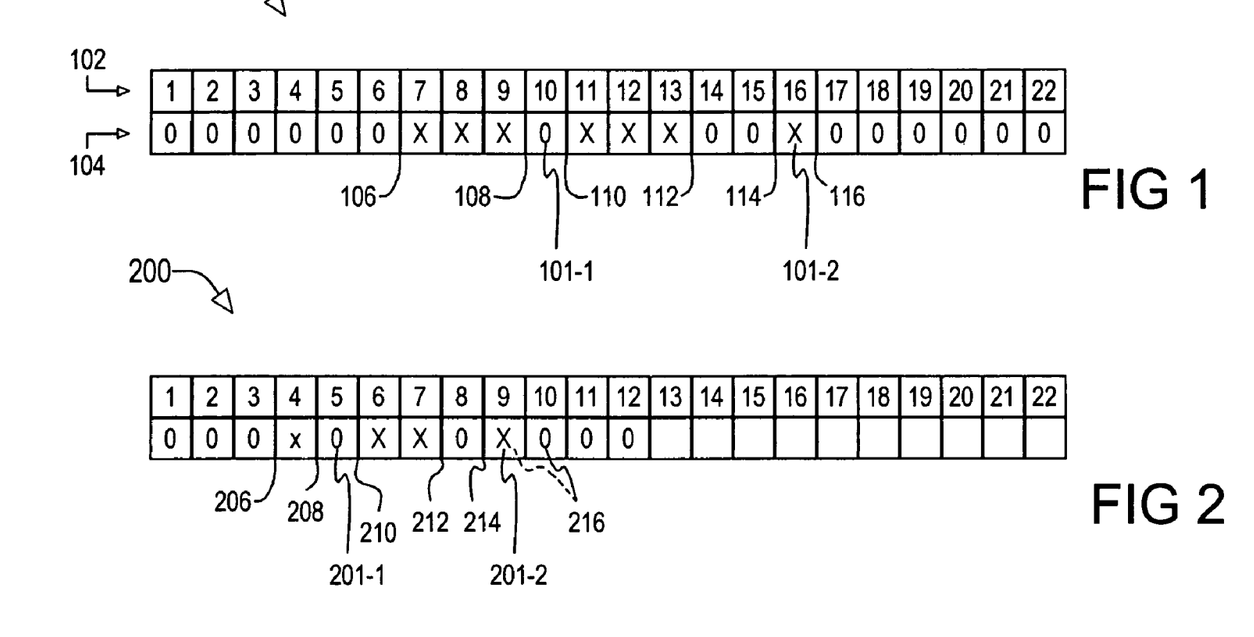
FIG. 1 illustrates a single line of a scanned image that is suitable for scaling using the present invention.
FIG. 2 illustrates the scanned line of FIG. 1 after scaling according to one embodiment of the present invention.

Turning now to FIG. 1 and FIG. 2, operation of the present invention is illustrated by examining a representative line of a scanned image before scaling (100) and after scaling (200) according to the present invention. Referring specifically to FIG. 1, a representative line 100 of a scanned image is depicted prior to scaling. Scanned line 100 represents a sequential set of pixels in either an x-direction or a y-direction. The present invention is designed for flexible scaling including the use of different scaling factors for the x-direction and the y-direction. To achieve flexible scaling, an image is scaled in a first direction using the scaling techniques of the present invention to achieve an intermediate scaled image. The intermediate scaled image is then scaled in the second direction using the same scaling techniques to achieve the final result. The choice of which direction (x or y) to scale first is an implementation detail and the present invention is suitable for scaling in either direction first, preferably under user control.

The scaling mechanism of the present invention focuses on pixel transitions. A pixel transition, as its name implies, occurs whenever a black pixel is followed by a white pixel and vice versa. In FIG. 1, the pixel transitions are indicated by reference numerals 106 through 116. Prior to the commencement of scaling, a scaling factor is selected or otherwise determined for both the x and y directions. Throughout this disclosure, scaling factors are expressed as decimals to the $10^{-3}$. To illustrate the invention using line 100 of FIG. 1, a scale factor of 1.723 is used.

It will be appreciated by those skilled in the field of data processing systems that dividing a value by a decimal value such as 1.723 likely entails the use of a floating point divide unit. Floating point arithmetic units operate on an exponent portion and a mantissa portion of a real number to achieve a result. Floating point arithmetic units and especially floating point dividers are well known to have undesirable complexity relative to fixed point arithmetic units. One embodiment of the present invention employs an additional multiplication step to eliminate the need to do any calculations in floating point format. Specifically, in the depicted embodiment wherein scaling factors are expressed to the $10^{-3}$ decimal point, the scaling factor and the pixel values (represented by reference numeral 102 in FIG. 1) are multiplied by 103 prior to performing the scaling technique. More generally, if a scaling factor is expressed to the $10^{-n}$ decimal point, the scaling factor and the pixel values are both multiplied by $10^n$. In this manner, the invention is able perform a fixed point divide operation to arrive at a scaled value thereby eliminating the need for the time consuming floating point calculations that are typical of conventional scaling engines. In one embodiment, the use of floating point units is entirely obviated and the scaling process is achieved using fixed point arithmetic operations exclusively.

After manipulating the scaling factor as described above, the scaled equivalent of the transition points 106 through 116 are determined and applied to the scaled scan line of FIG. 2. Thus, for example, the transition point 106 of FIG. 1 is scaled to the transition point 206 of FIG. 2, transition point 108 of FIG. 1 is scaled to transition point 208 of FIG. 2, and so forth. Using an example to illustrate, transition point 106 is a white-to-black transition (as indicated by the pixel values 104) that occurs at pixel 7. Multiplying the pixel value 7 and the scaling factor by $10^3$, the scaled pixel position for this first transition is determined by dividing 7000 by 1723 using fixed point arithmetic. Discarding the remainder results in the first transition 206 occurring at pixel 4 in the scale scan line of FIG. 2. Thus, pixel 4 of scaled line 200 becomes a black pixel (denoted by "X"). The second transition of scan line 100 is the transition 108 occurring at pixel 10. Using the same procedure described above with respect to transition 106 results in the second transition 208 of the scaled scan line 200 of FIG. 2 occurring at pixel 5 in second scan line 200 and thus pixel 5 is set to white (denoted by "0"). The third transition 110 of line 100 occurs at pixel 11, which corresponds to pixel 6 in second scan line 200 so that pixel 6 in line 200 is black. The fourth transition 112 of line 100 occurs at pixel 14, which converts to pixel 8 in line 200 so that pixel 8 is set to white. The fifth transition 114 occurs at pixel 16 of line 100, which causes pixel 9 of line 200 to be white. The sixth transition 116 of line 100 occurs at pixel 17. When scaled as described above, pixel 17 scales to pixel 9 of line 200, which is the same value to which transition 114 scaled.

One aspect of the present invention is the preservation of isolated pixel features. With respect to FIG. 1, line 100 includes an isolated white pixel 101-1 at pixel 10 and an isolated black pixel 101-2 located at pixel 16. When scaling the transition pixels into the scaled scan line, the present invention preserves isolated pixels by preventing a subsequent pixel transition from overwriting an existing transition in the scaled line. More specifically with respect to FIG. 1 and FIG. 2, the first isolated pixel 101-1 was preserved in scaled line 200 because transition 108 at pixel 10 scaled to pixel 5 of line 200 while transition 110 of line 100 scaled to pixel 6 in line 200. The second isolated pixel 101-2 is preserved according to the present invention by preventing the scaled equivalent of the sixth transition pixel, which is equal to the scaled equivalent of the fifth transition pixel, from overwriting the fifth transition in the scaled line. Thus, although the sixth transition 116 occurs at pixel 17 of line 100 and scales to pixel 9 of scaled line 200, the sixth transition in scaled line 200 cannot occur at pixel 9 since this is where the fifth transition occurs. Accordingly, the sixth transition 216 is "moved" from pixel 9 to pixel 10 thereby preserving the isolated pixel feature 101-2 of line 100 as isolated pixel feature 201-2 in the scaled line 200.

Figure 3:
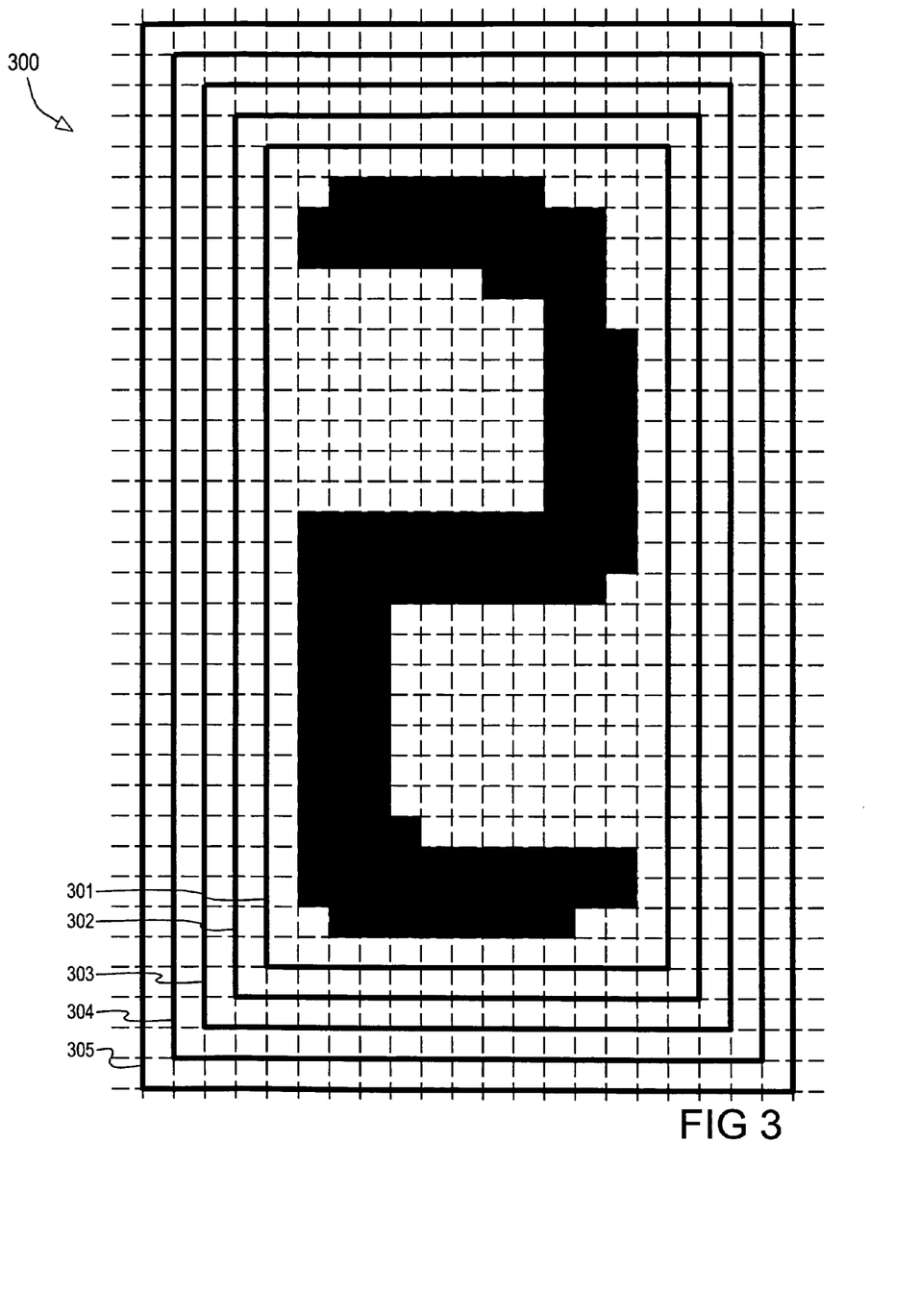
FIG. 3 depicts a raw image of an alphanumeric character and five levels of padding around the character according to one embodiment of the present invention.

Referring now to FIG. 3, a raw image 300 of a character (the number "2") is depicted to illustrate a feature of the present invention. In the illustrated example, the raw image 300 occupies an 11×25 array of pixels. The scaling technique described above may be applied to raw image 300 to reduce the image to a scaled version that is, for example, 4×7 pixels, which is a standardized pixel format. Empirical evidence suggests that the scaled image that results from the described scaling technique can be varied to some extent by padding the raw image. Padding refers to a technique in which a border of empty (white) pixels are intentionally appended to the raw image. The degree of padding refers to the number of such empty pixel borders that are appended to the image. In FIG. 3, five degrees of padding are represented by the five perimeters 301 through 305. The first perimeter 301 has a single degree of padding, a second perimeter 303 has a second degree of padding, and so forth. As such the first perimeter occupies an array of 13×27 pixels, the second perimeter occupies an array of 15×29 pixels, and so forth.

Figure 4:
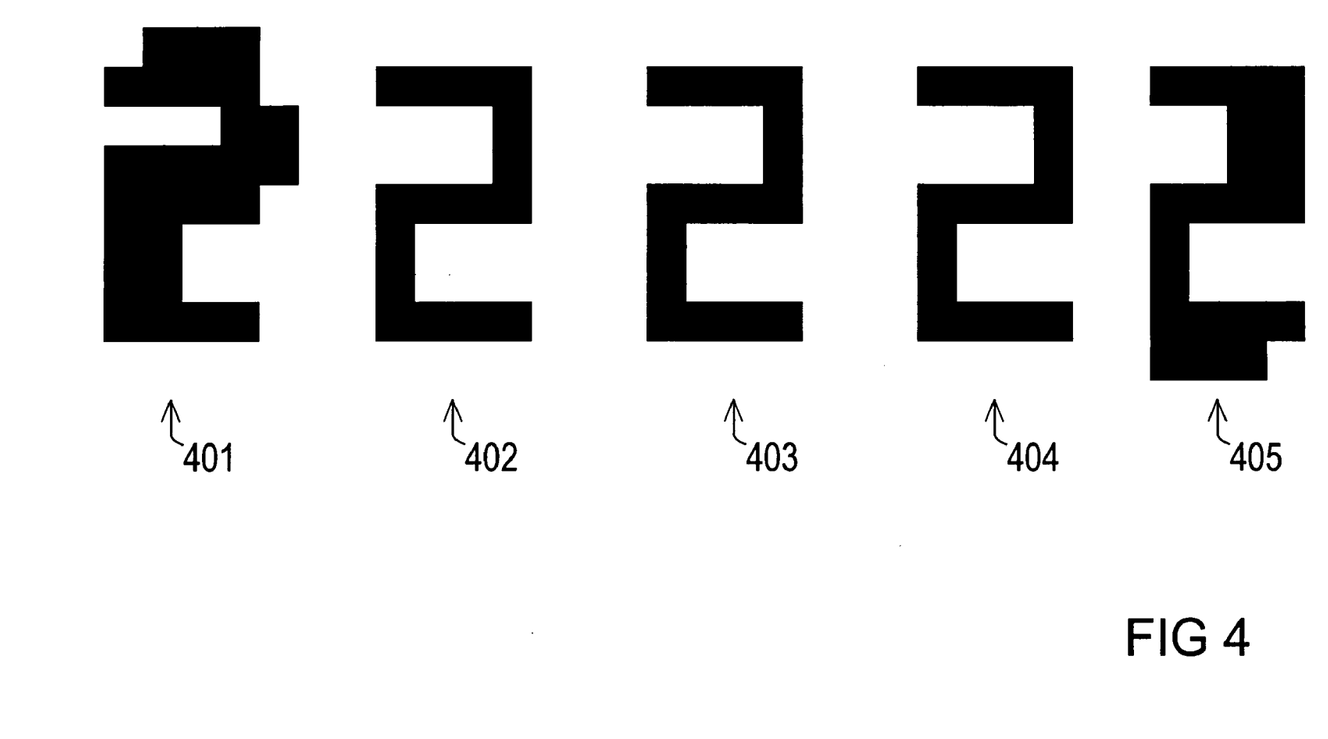
FIG. 4 illustrates the results of scaling the character of FIG. 3 using the scaling techniques of the present invention for each of the five levels of padding shown in FIG. 3.

One implementation of the present invention includes a technique or process in which a raw image is scaled two or more times. During each scaling iteration, the degree of padding applied to the raw image is altered. For example, during a first scaling iteration, a single degree of padding is applied to the raw image, during a second scaling iteration, a second degree of padding is applied to the raw image, and so forth. Referring to FIG. 4, the results of scaling the raw image 300 of FIG. 3 using five different iterations and five different degrees of padding (from 1 to 5) are depicted as reference numerals 401 through 405 respectively. It is apparent from these results that the degree of padding affects the resulting scaled image. By scaling the raw image multiple times with different degrees of padding, the present invention is able to improve the readability of the scaled images. In the illustration of FIG. 4, for example, the second, third, and fourth iterations produce scaled images that are well suited for an optical character reader and/or for visualization.

In one embodiment, the benefit in terms of reduced calculation times attributable to the integer math technique is leveraged to enable multiple scaling iterations using different degrees of padding without performance penalty relative to conventional floating point scaling machines. The multiple scaling iterations produce multiple scaled images, which can then be interpreted by an OCR reader, for example. The results of the set of readings could then be provided to a decision engine that considers similarities and differences in the set to select the most probable result for a particular raw image. If, for example, three of the five readings suggested a value of "2" while two other readings were indeterminate or contrary, the decision engine, based on a set of supplied rules, might select "2" as the most probable result. The decision engine concept is described in co-pending patent application entitled, Positional Synchronization in a Multivoting Character Recognition Environment, ? Docket CHA9 2003 0024 US1, filed Oct. 31, 2003, which is incorporated by reference herein.

Portions of the invention may be implemented as a set or sequence of computer executable instructions, stored on a computer readable medium, for scaling a bi-tonal image. In such embodiments, the computer readable medium may be substantially any form of storage medium including nonvolatile or persistent storage devices such as hard disks, floppy diskettes, CD's, DVD's, and flash memory devices as well as volatile storage media including dynamic and static RAM devices.

Figure 7:
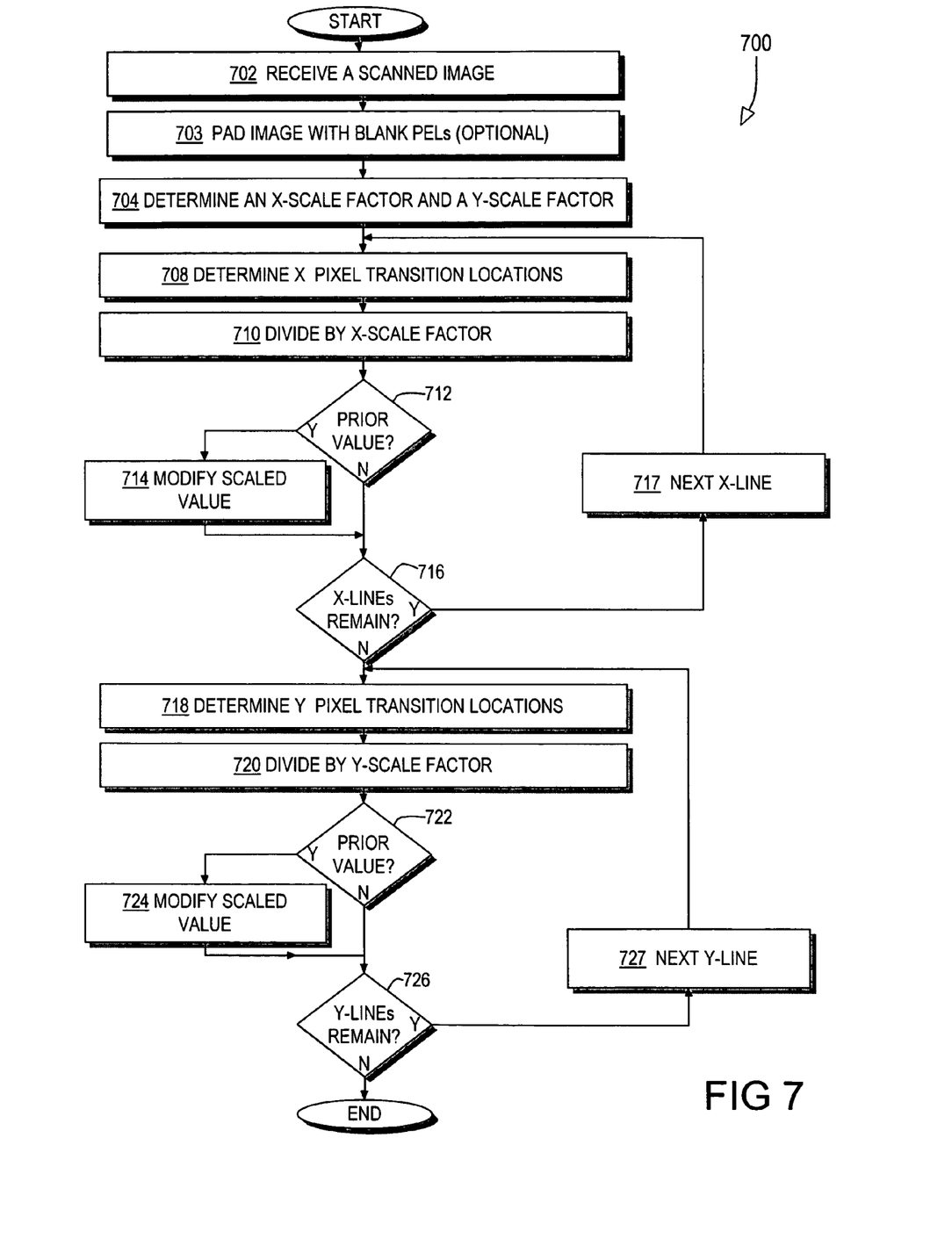
FIG. 7 illustrates a flow diagram of a method of scaling a bi-tonal image 10 according to an embodiment of the present invention.

Referring now to FIG. 7, a flow diagram of a method of scaling a bi-tonal image according to an embodiment of the present invention is depicted. In the depicted embodiment, method 700 includes receiving (block 702) a scanned image, such as the image received from capture device 601 of FIG. 6. Prior to scaling the image, optional padding (block 703) may be applied to the image as discussed above with respect to FIG. 2. After padding the received image as desired, x-scale and y-scale factors are selected or otherwise determined (block 704). The present invention enables asymmetric scaling in which the x-scale factor and the y-scale factor are chosen independently. Thus, as used herein, the term "asymmetric scaling" includes cases in which the x and y scale factors are different as well as cases in which the x and y scale factors are equal.

After the appropriate scaling factors have been selected, processing of the image along a first axis is performed. In the depicted embodiment, the rows (parallel to an x-axis orientation) of the received image are processed first in blocks 708 through 716. Scaling each of the rows results in an interim scaled image (at the input of block 718) that is then processed to scale the columns and achieve the final scaled image.

Referring to the row processing portion of method 700, each pixel transition location in the row being processed is determined in block 708. The pixel transition locations are then divided by the x-scaled factor in block 710. In the embodiments that emphasize efficiency of the scaling operation, the division of block 710 is achieved using fixed point arithmetic exclusively by first multiplying the scale factor and the pixel transition information by a common value (such as 1000) as described above. After a pixel transition value has been divided by the appropriate scale factor, method 700 determines (block 712) whether the scaled pixel transition value is also the scaled pixel transition value of a previously processed pixel transition. If the current scaled pixel transition value equals a previous value, the current scale value is modified (block 714) to prevent the current scaled transition value from overwriting the previous scaled value. In this manner, the processing that occurs attempts to preserve isolated pixel information that might otherwise be lost in conventional scaling techniques. Modification of the current scaled value in block 714 may include simply incrementing the scaled value until the modified scaled pixel transition value is unique (i.e., has not been encountered previously in the row being processed). Method 700 then determines (block 716) whether all rows in the image have been processed. If not, the next row is selected (block 717) and processing of the new row proceeds. When all rows have been processed, column processing proceeds as depicted in blocks 718 through 727 in a manner analogous to the processing of the image rows in blocks 708 through 717.

Figure 5:
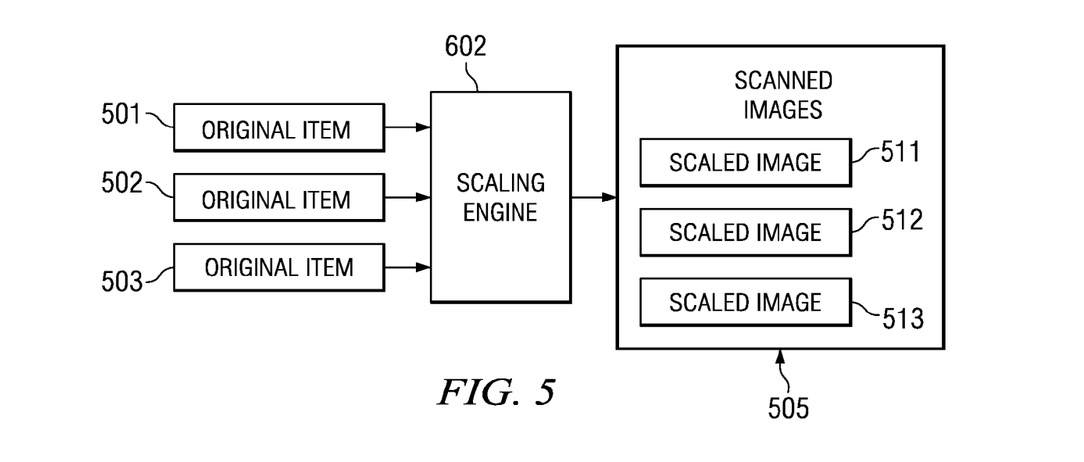
FIG. 5 depicts an application of the flexible scaling technique of the present invention for scaling differently sized original documents such as canceled checks to achieve a common size for presentation on a document such as a bank statement.

Referring now to FIG. 5, one application of the flexible and efficient scaling techniques of the present invention is illustrated. In this application, a set of original items 501 through 503 are provided to a scaling engine 602 as described. The set of original items 501 through 503 might represent the raw images of a set of checks being automatically processed by a bank or check processing center. In the depicted example, the raw images 501 through 503 are all of different sizes, perhaps due to different sizes of the respective checks that produced the raw images. In this case, a summary of the monthly transactions for the customer might include scanned images of the three items. It would be highly desirable in this case to produce the scanned images such that each of the scanned images is of the same size in the final document represented in FIG. 5 by reference numeral 505.

Accomplishing this desired result is achieved according to the present invention using scaling engine 602 to scale each original item 501 through 503 using distinct sets of x and y scale factors so that the resulting scaled images of items 501 through 503, represented in FIG. 5 by reference numerals 511 through 513 respectively, are of the same size for easy visualization. In other implementations, equal sizing of the scaled images may not be desired or required. In such cases, each original item 501 through 503 may be scaled using its own set of x and y scale factors (where the x and y scale factors within each set may or may not be equal) so that the relative sizes of the scaled images may be determined independently of one another.

It will be apparent to those skilled in the art having the benefit of this disclosure that the present invention contemplates an imaging system and method that uses flexible, efficient, and reliable scaling techniques. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for scaling a bi-tonal image, the method comprising:
responsive to receiving a scanned image, determining, by a processor, a first scale factor; processing, by a processor, a line of the scanned image, wherein the line is oriented parallel to a first axis, and wherein processing comprises: determining a scanned pixel position of a pixel transition in the line; dividing the scanned pixel position by the first scale factor to determine a scaled pixel position for the pixel transition; and responsive to the scaled pixel position for the pixel transition equaling a previous scaled pixel position of a previously processed pixel transition, adjusting the scaled pixel position to prevent the previously processed pixel transition from being overwritten in a scaled image.

2. The method of claim 1, wherein dividing the scanned pixel position includes dividing the scanned pixel position using fixed point arithmetic exclusively.

3. The method of claim 2, wherein dividing the scanned pixel position using fixed point arithmetic exclusively includes:
multiplying each determined scanned pixel location by $10^N$, where N is an integer between 2 and 5; and
dividing a result of the multiplication by the first scale factor multiplied by $10^N$.

4. The method of claim 2, further, comprising:
determining a second-scale factor, wherein the second scale is different than the first scale factor; and
upon processing the line to obtain an interim scaled image, processing a second line of the interim scaled image, wherein the second line is parallel to a second axis, by:
determining a second scanned pixel position of a second scanned pixel transition in the second line;
dividing the second scanned pixel position by the second scale factor to determine a second scaled pixel position for the second pixel transition; and
responsive to the scaled pixel position for the pixel transition equaling a previous scaled pixel position of a previously processed pixel transition, adjusting the second scaled pixel position to prevent the previously processed pixel transition from being overwritten in the scaled image.

5. The method of claim 4, further comprising:
processing a first image using first x and y scale factors;
scaling a second scanned image using second x and y scale factors, wherein the first x and y scale factors and the second x and y second scale factors differ; and
generating a document containing the first image and the second image.

6. The method of claim 5, wherein generating a document comprises generating a bank statement, and wherein the first scanned image comprises a first check copy and the second scanned image comprises a second check copy.

7. The method of claim 1, further comprising, prior to processing the line, padding the scanned image with a perimeter of empty pixels.

8. The method of claim 7, further comprising:
iterating, a plurality of times, padding the scanned image and processing the line of the scanned image, wherein a number of empty cells in the perimeter varies for each iteration; and
selecting a final scaled image from a set of scaled images produced by iterating.

9. A computer program product comprising computer executable instructions, stored on a computer readable medium, for scaling an image, the computer program product comprising:
instructions for scaling a first scanned image in a first direction using a first scaling factor;
instructions for scaling the first scanned image in a second direction according to a second scaling factor;
wherein at least one image line of a set of image lines in the first scanned image includes an isolated pixel and further wherein the instructions for scaling the first scanned image includes instructions for preserving the isolated pixel in a scaled image;
wherein the instructions for scaling the first scanned image in the first direction includes:
instructions for determining, for each oriented image line oriented in the first direction of the first scanned image, a a scanned pixel position of a pixel transition in each oriented image line; and
instructions for dividing the scanned pixel position by the first scale factor to determine a scaled pixel position for the pixel transition in the scaled image; and
instructions, for adjusting the scaled pixel position to prevent a previously processed pixel transition from being overwritten in the scaled image in response to the scaled pixel position for the pixel transition equaling a previous scaled pixel position of the previously processed pixel transition.

10. The computer program product of claim 9, wherein the instructions for dividing the scanned pixel position include instructions for multiplying the scanned pixel position by $10^N$, wherein N is an integer between 2 and 5, and instructions for dividing the resulting product by the first scaling factor multiplied by $10^N$.

11. The computer program product of claim 10, wherein the instructions for dividing and the instructions for multiplying include instructions for dividing and multiplying the scanned pixel position value using integer arithmetic exclusively.

12. The computer program product of claim 11, further comprising:
instructions for determining, for second lines oriented in a second direction of the scanned image, a second scanned pixel position of a second scanned pixel transition in the second lines; and instructions for dividing the second scanned pixel position by the second scale factor to determine a second scaled pixel position for the second pixel transition in the scaled image.

13. The computer program product of claim 12, wherein the instructions for dividing the second scanned pixel position includes instructions for adjusting the scaled pixel position to prevent the previously processed pixel transition from being overwritten in a scaled image in response to the scaled pixel position for the pixel transition equaling a previous scaled pixel position of a previously processed pixel transition.

14. The computer program product of claim 13, further comprising instructions for processing the first scanned image using a first set of first and second scaling factors, and instructions for scaling a second scanned image using a second set of scaling factors to form a second scaled image, wherein the first and second sets of scale factors differ.

15. The computer program product of claim 14, further comprising instructions for generating a document including the scaled image and the second scaled image wherein the document comprises a bank statement, and wherein the first scanned image comprises a first check copy and the second scanned image comprises a second check copy.

16. The computer program product of claim 9 further comprising instructions for padding the first scanned image prior to scaling by appending a perimeter of blank pixels to the first scanned image.

17. The computer program product of claim 16, further comprising:
    instructions for iterating, a plurality of times the instructions for padding, the instructions for scaling first scanned image in a first direction, and the instructions for scaling the first scanned image in the second direction, wherein a degree of padding varies during each iteration, wherein a set of scaled images is produced, and
    instructions for selecting a single scaled image from among the set of scaled images.

18. An image scaling system, comprising:
    a capture device to scan an original image and to produce a bi-tonal image therefrom;
    a scaling engine to scale the bi-tonal image using independent x and y scaling factors to produce a scaled image, wherein isolated pixels in the bi-tonal image are preserved in the scaled image; wherein the scaling engine produces the scaled image using fixed point arithmetic calculations exclusively; wherein the scaling engine determines a scanned pixel position of a pixel transition in the line; wherein the scaling engine divides the scanned pixel position by the first scale factor to determine a scaled pixel position for the pixel transition; and wherein the scaling engine adjusts the scaled pixel position to prevent the previously processed pixel transition from being overwritten in a scaled image in response to the scaled pixel position for the pixel transition equaling a previous scaled pixel position of a previously processed pixel transition.

19. The system of claim 18, wherein the scaling engine pads the bi-tonal image prior to scaling by appending a perimeter of blank pixels around the bi-tonal image.

* * * * *

UNITED STATES PATENT AND TRADEMARK OFFICE
CERTIFICATE OF CORRECTION

PATENT NO.       : 7,593,600 B2  Page 1 of 1
APPLICATION NO.  : 10/793452
DATED            : September 22, 2009
INVENTOR(S)      : Prakash et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1389 days.

Signed and Sealed this

Fourteenth Day of December, 2010

David J. Kappos
*Director of the United States Patent and Trademark Office*